(12) United States Patent
Niehoff

(10) Patent No.: US 8,687,977 B2
(45) Date of Patent: Apr. 1, 2014

(54) READING LAMP

(75) Inventor: Wolfgang Niehoff, Wedemark (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 716 days.

(21) Appl. No.: 12/586,251

(22) Filed: Sep. 17, 2009

(65) Prior Publication Data

US 2010/0189285 A1    Jul. 29, 2010

(30) Foreign Application Priority Data

Sep. 18, 2008 (DE) .......................... 10 2008 047 963
Jan. 15, 2009 (DE) .......................... 10 2009 005 175

(51) Int. Cl.
    *G02B 6/00*      (2006.01)

(52) U.S. Cl.
    USPC ........................................ 398/172; 315/185 R

(58) Field of Classification Search
    USPC .................. 398/118–131, 172; 315/185 R
    See application file for complete search history.

(56) References Cited

U.S. PATENT DOCUMENTS

| | | | |
|---|---|---|---|
| 5,390,040 A * | 2/1995 | Mayeux ........................ | 398/129 |
| 5,495,357 A * | 2/1996 | Osterhout .................... | 398/107 |
| 5,602,668 A | 2/1997 | Kuchta | |
| 5,986,786 A * | 11/1999 | Crandall et al. ............. | 398/130 |
| 6,325,343 B1 * | 12/2001 | Flagg ........................... | 248/174 |
| 2002/0167701 A1 | 11/2002 | Hirata | |
| 2007/0160373 A1 * | 7/2007 | Biegelsen et al. ............ | 398/118 |
| 2007/0242955 A1 * | 10/2007 | Kavehrad ..................... | 398/130 |
| 2008/0080197 A1 * | 4/2008 | Heine et al. .................. | 362/471 |
| 2009/0208221 A1 * | 8/2009 | Sasai ............................ | 398/118 |
| 2009/0245806 A1 * | 10/2009 | Murayama et al. .......... | 398/130 |
| 2010/0054748 A1 * | 3/2010 | Sato ............................. | 398/130 |

FOREIGN PATENT DOCUMENTS

| | | |
|---|---|---|
| DE | 603 16 178 T2 | 6/2008 |
| JP | 2002-190776 A | 7/2002 |
| WO | WO 02/25842 A2 | 3/2002 |
| WO | WO 2008050729 A1 * | 5/2008 |

* cited by examiner

*Primary Examiner* — Danny Leung

(74) *Attorney, Agent, or Firm* — Kilpatrick Townsend & Stockton LLP

(57) ABSTRACT

There is provided a reading lamp having a lighting unit (BE) which has at least first light emitting diodes (LEDs) and/or second light emitting diodes (IR-LEDs) for the emission of IR radiation. The reading lamp further has a modulation unit (ME) for modulation of the light emission of the first and/or second light emitting diodes in dependence on an input signal (IN).

7 Claims, 2 Drawing Sheets

READING LAMP

CROSS-REFERENCE TO RELATED APPLICATIONS

Figure 1:
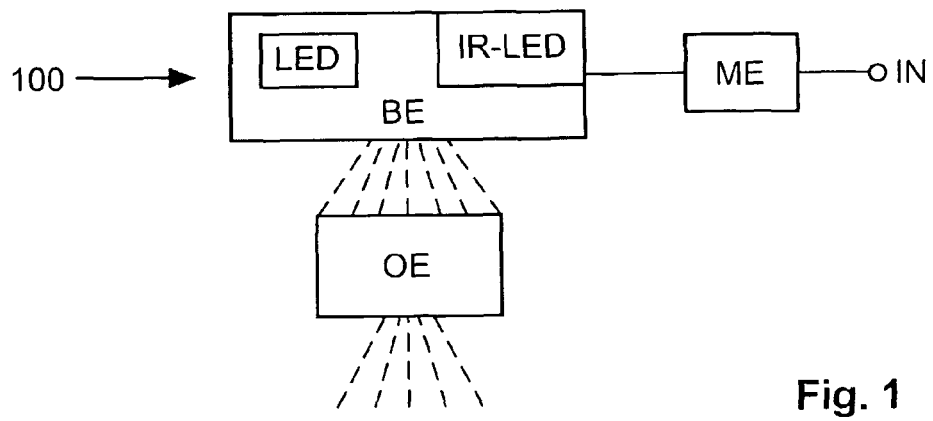

The present application claims priority to German Patent Application No. 10 2008 047 963.2, filed Sep. 18, 2008, and German Patent Application No. 10 2009 005 175.9, filed Jan. 15, 2009, the entire contents of which are herein incorporated by reference for all purposes.

The present invention concerns a reading lamp.

Reading lamps are known for example from aircraft, motor vehicles or buses, which are typically arranged above a seat and which can be switched on and off and positioned by a passenger. In that respect a passenger typically so adjusts his reading lamp that his working or reading area enjoys optimum illumination. Such reading lamps typically have a reflector to afford improved illumination. The arrangement of the reading lamps and the reflector is so selected as to provide a light spot or illuminated region which is as concentrated as possible for example in order not to disturb a neighbor.

DE 603 16 178 T2 describes a communication device for optical communication, using an LED lighting element for optical communication.

JP 2002190776 A discloses an optical data transfer system. An LED lighting unit is provided on the ceiling and can issue a light signal at two different frequencies for transmitting '0' and '1'.

U.S. Pat. No. 5,602,668 describes data communication based on infrared data signals.

US No 2002/0167701 A1 describes optical transmission of data based on light which is produced by an LED.

WO 02/25842 A2 describes data transmission based on light signals.

Thus an object of the present invention is to provide an improved reading lamp which has broader possible uses.

That object is attained by a reading lamp as set forth in claim 1.

Thus there is provided a reading lamp having a lighting unit which has at least first light emitting diodes for the emission of IR radiation and/or visible light. The reading lamp further has a modulation unit for modulation of the light emission of the first and/or second light emitting diodes in dependence on an input signal.

In accordance with an aspect of the present invention the reading lamp has an optical unit for influencing the light emission of the first and/or second light emitting diodes. Thus for example the light emission can be focussed by means of the optical unit.

According to a further aspect of the present invention the optical unit has a filter for attenuating and/or intensifying certain frequency ranges of the emitted light.

According to a further aspect of the present invention the optical unit has a reflector for at least partially reflecting the emitted light.

According to a further aspect of the invention the reading lamp has a microphone for recording speech signals.

The invention also concerns a vehicle having at least one seat and a reading lamp arranged above the seat.

The invention also concerns an aircraft having a plurality of seats and a plurality of reading lamps arranged thereabove.

The invention further concerns a delegate speech station comprising a microphone and a reading lamp having a lighting unit with first light emitting diodes and/or second light emitting diodes for the emission of IR radiation. The reading lamp further has a modulation unit for modulating the light emission of the first and/or second light emitting diodes in dependence on an input signal.

The present invention concerns the notion of providing a reading lamp having first light emitting diodes LEDs and second light emitting diodes LEDs. In that case the first light emitting diodes LEDs serve to produce visible light and the second light emitting diodes LEDs serve to produce IR light or IR radiation (as an alternative thereto it is also possible to provide only first light emitting diodes which can emit both IR light and also visible light). A working or reading area is illuminated by means of the first light emitting diodes LEDs. Information can be transmitted by means of the second light emitting diodes IR-LEDs. For that purpose the IR light of the second light emitting diodes LEDs can be modulated. The first and second LEDs can be operated independently of each other, that is to say the IR-LEDs can be operated even if the first LEDs are switched off. In an alternative embodiment only first light emitting diodes LEDs are provided, wherein those LEDs serve both for illuminating a working and reading area and also information transmission. In that case at least some of the LEDs are modulated to transmit corresponding items of information. To improve the optical properties of the reading lamp optical units can be provided, which for example serve to focus the transmitted light and the IR light. Those optical units can also have filters for attenuating and/or intensifying certain frequency ranges of the light.

In that case the first and second light emitting diodes LEDs can preferably be individually actuated by a modulation uni ME so that individualised items of information can be transmitted by means of the LEDs.

The light of the first and second light emitting diodes LEDs is preferably jointly focussed and/or filtered by means of the optical units OE.

In accordance with a further aspect of the present invention the light of the first and second light emitting diodes LEDs can be emitted in different directions, in which case for example an optical unit is arranged in the light cone of the second light emitting diodes LEDs.

Further configurations of the invention are subject-matter of the appendant claims.

Advantages and embodiments by way of example of the invention are described in greater detail hereinafter with reference to the drawing.

Figure 2:
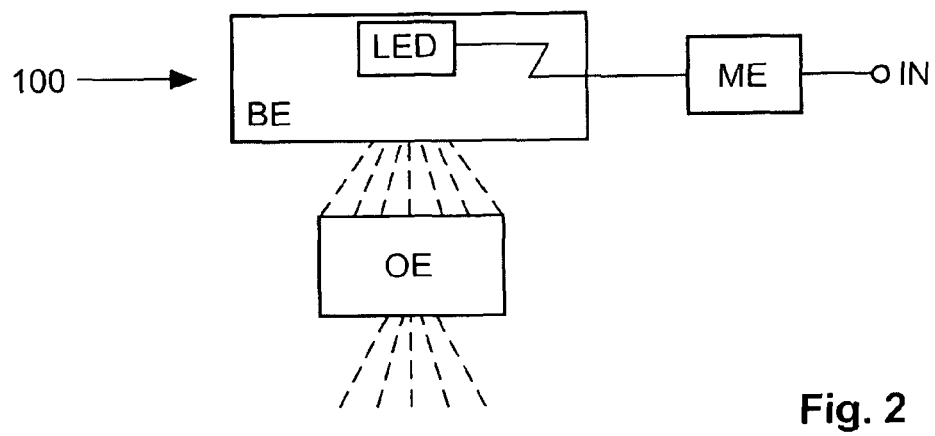
Figure 3:
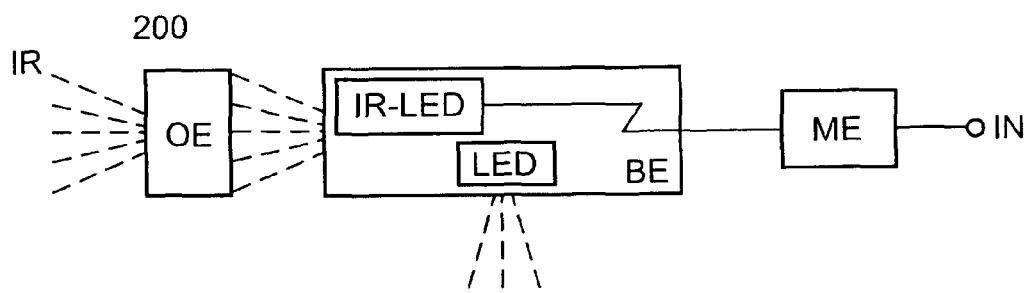
Figure 4:
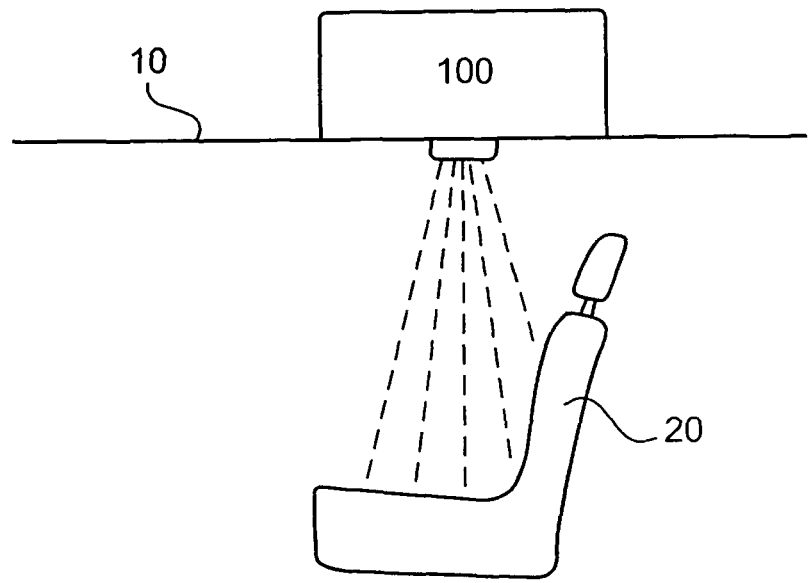
Figure 5:
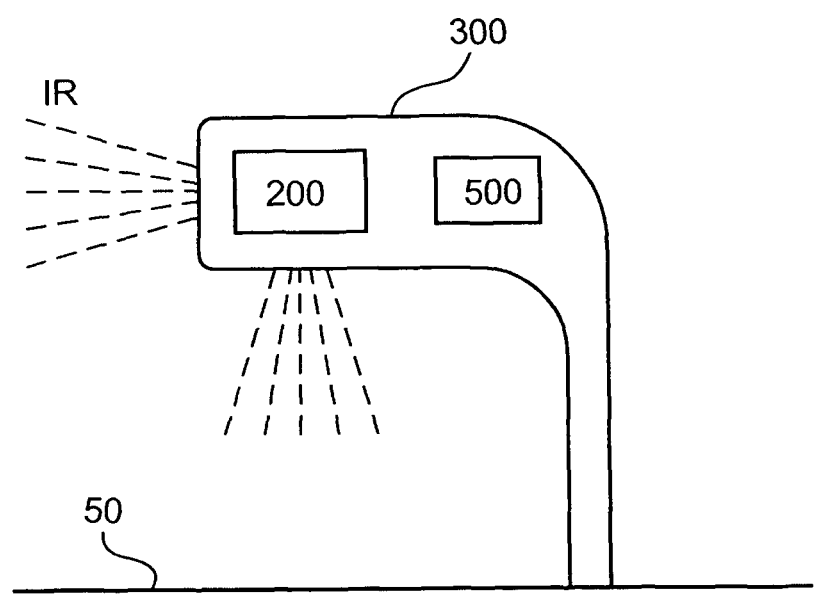

FIG. 1 shows a diagrammatic view of a reading lamp according to a first embodiment, FIG. 2 shows a diagrammatic view of a reading lamp according to a second embodiment, FIG. 3 shows a diagrammatic view of a reading lamp according to a third embodiment, FIG. 4 shows a diagrammatic arrangement of a reading lamp in a vehicle according to a fourth embodiment, and FIG. 5 shows a diagrammatic view of a reading lamp according to a fifth embodiment.

FIG. 1 shows a diagrammatic view of a reading lamp in a first embodiment. The reading lamp has a lighting unit BE, a modulation unit ME and optionally an optical unit OE. The lighting unit BE can have first and second light emitting diodes LEDs. Optionally the lighting unit can have a receiving unit EE which is suitable for receiving for example IR light or visible light. In that case the first LEDs serve to produce visible light. The second LEDs IR-LEDs serve to produce IR light or an IR radiation which is modulated by the modulation unit ME to modulate items of information which have been received by the input terminal IN on the IR light, that is to say the IR light is modulated. As an alternative thereto it is also possible to provide light emitting diodes or light emitting diode units which can emit both IR light and also visible light. The optical unit OE serves to influence, that is to say for example focus, the visible light from the first LEDs and the modulated IR light of the second LEDs IR-LEDs. The optical unit OE can further have a filter for filtering given frequencies of the visible and IR light. Thus given frequencies can be attenuated and/or others can be intensified. The IR light can be modulated by means of the modulation unit ME in such a way that it can only be demodulated by a given receiving unit. That makes it possible to provide for personified or personalised information transmission. By virtue of the optical unit OE it is possible to provide that the light cone of the visible light corresponds to the light cone of the IR light.

Focussing by means of the optical unit OE makes it possible to achieve very tightly delimited and spot-accurate illumination and information transmission. The optical units can permit double/multiple focal points for the first and second LEDs.

The light emitting diodes and the optical unit can be in the form of one unit. The light emitting diodes can be for example arranged in or integrated into the optical unit.

FIG. 2 shows a diagrammatic view of a reading lamp in a second embodiment. The reading lamp 100 has a lighting unit BE with LEDs. The lighting unit BE is coupled to a modulation unit ME which modulates the light of the light emitting diodes LEDs in dependence on the signal received at the input terminal IN. The reading lamp can further optionally have optical units OE. Optionally the lighting unit can have a receiving unit EE suitable for receiving for example IR light or visible light. The optical unit OE can serve for example to focus the light cone of the light emitting diodes LEDs. Optionally the optical unit OE can have a filter unit for filtering the light of the light emitting diodes. The modulated light of the light emitting diodes can be received for example by a suitable receiving unit so that items of information can be wirelessly transmitted from the reading lamp to the receiving unit.

In accordance with the second embodiment it is thus possible to dispense with IR light emitting diodes. That can be achieved for example by some of the light emitting diodes being used for illumination while others are used only for information transmission. Alternatively or additionally thereto the light of the light emitting diodes can be so modulated that such modulation is not perceived by the human eye.

FIG. 3 shows a diagrammatic view of a reading lamp in a third embodiment. The reading lamp 200 has a lighting unit BE, a modulation unit ME and optionally an optical unit OE. The lighting unit BE has first and second light emitting diodes LEDs, IR-LEDs. Alternatively thereto it is also possible to provide light emitting diodes or light emitting diode units which can emit both IR light and also visible light, in which case that can take place optionally independently of each other. Optionally the lighting unit can have a receiving unit EE suitable for receiving for example IR light or visible light. The first light emitting diodes serve to emit visible light while the second light emitting diodes serve to emit infrared light which is modulated by the modulation unit ME. While the light of the first and second light emitting diodes is emitted in a common direction in the first and second embodiments, the light of the first light emitting diodes is emitted in a first direction while the light of the second light emitting diodes IR LED is emitted in a second direction.

The reading lamps in the first, second and third embodiments can each have an operating voltage supply which for example affords an operating voltage of 12 V. Optionally modulation of the first and second light emitting diodes can be achieved by way of modulation of the operating voltage. Thus modulation of the light emitting diodes can be made possible both by means of modulation of the operating voltage and also separately from modulation of the operating voltage.

Although FIGS. 1 through 3 show the optical unit OE in a position in the light beam or the light cone of the first and second light emitting diodes at least a part of the optical unit can also be arranged laterally of or behind the light emitting diodes. In this case for example a reflector can be at least partially arranged behind the light emitting diodes so that the light of the light emitting diodes can be reflected in a preferred direction and possibly focussed. Modulation of the first and/or second diodes can represent FM or AM modulation.

FIG. 4 shows a diagrammatic view of a part of a vehicle or an aircraft in accordance with a fourth embodiment. A reading lamp 100 can be provided in a ceiling 10 of a vehicle or aircraft. Optionally the lighting unit can have a receiving unit EE suitable for receiving for example IR light or visible light. In this case the reading lamp 100 is preferably arranged aver a seat 20. In this case the reading lamp 100 can correspond to a reading lamp in accordance with the first or second embodiment. Thus both the visible light of the first light emitting diodes and also the IR light of the second light emitting diodes (or both the IR light and also the visible light are produced and radiated by light emitting diodes or light emitting diode units) are radiated in a common direction so that it is possible to achieve concentrated illumination of a spot. The passenger or user of the reading lamp can set an illumination spot or cone which is optimum for him, by setting or positioning of the reading lamp. As the spot for the IR light and the light cone of the visible light coincide the IR light is automatically directed on to a working area or a reading area of the user. The IR light can also be received by way of reflections of a book or a working support by an IR receiving unit.

Concentration or focussing of the beam path of the visible light and the IR light can be achieved by means of the optical unit OE.

FIG. 5 shows a diagrammatic view of a reading lamp in a fifth embodiment. In this case a reading lamp 200 can be provided for example on a work surface or a table surface and can have at least one microphone 500 for recording speech signals. Optionally the lighting unit can have a receiving unit EE suitable for receiving for example IR light or visible light. The reading lamp can be part of a delegate speech station 300, in which case for example an interpreter channel can be transmitted by means of the IR light and received by suitable IR receiving units. That is advantageous as only small IR radiating devices are required in the reading lamp. Thus large radiating devices which illuminate the entire conference hall become redundant. The reading lamp in FIG. 5 can be in the form of a reading lamp in accordance with the third embodiment. In addition to the audio signals or items of information which are emitted by way of large IR radiating devices, a corresponding reading lamp also makes it possible to transmit further items of information or audio signals. That makes it possible to achieve decentral illumination and decentral IR radiation.

In the fifth embodiment the visible light of the first diodes can be radiated downwardly on to the workstation while the IR light of the second light emitting diodes can be radiated to a delegate. Alternatively thereto the IR light and the visible light can be produced by the same light emitting diodes or light emitting diode units (for example independently of each other).

Information can be communicated to specific receivers by way of suitable encoding of the transmitted items of information. Additionally or alternatively thereto additional items of information can be transmitted to selected places.

In the fifth embodiment therefore there can be provided a delegate speech station or a chairman speech station having a reading lamp and a microphone 500. The reading lamp in the delegate speech station in accordance with the fifth embodiment can have first light emitting diodes for emitting visible light and/or second light emitting diodes for emitting IR radiation. If the reading lamp in the fifth embodiment is implemented without IR light emitting diodes there is then provided at least one delegate speech station having a reading lamp and a microphone. If however the reading lamp has two light emitting diodes for emitting IR radiation then as described hereinbefore the region around the reading lamp can be supplied with IR light so that, if a suitable receiving unit such as for example an under-chin headphone set is provided, items of information can be transmitted to the under-chin headphone set or the receiving unit respectively.

Preferably the delegate speech station has at least one microphone 500 and a reading lamp 200 having first light emitting diodes for the emission of visible light and second light emitting diodes for the emission of IR radiation.

The above-described receiving units EE can be provided in the lighting unit BE and/or in the optical unit OE. That can have the advantage that a broad transmission cone or reception cone can be provided by the optical unit OE. Alternatively or additionally thereto the receiving unit can also be implemented by way of the first and second LEDs in the lighting unit BE. The electronic system for reception can further be provided in the modulation unit ME.

In accordance with a further embodiment light emitting diodes LEDs can be provided, which can emit both infrared and also visible light. Those light emitting diodes can be provided in the form of one unit and have at least one light emitting diode which can emit infrared and/or visible light. By actuation of the light emitting diodes, they can emit infrared and visible light both jointly and also independently of each other. Thus those light emitting diodes can also emit infrared light if the emission of visible light is switched off.

Furthermore those light emitting diodes can be provided in a lighting unit which also has an optical unit. The optical unit can have a filter for attenuating and/or intensifying given frequency ranges of the emitted light and/or a reflector for at least partially reflecting the emitted light. Preferably the light emitting diodes and the optical unit can be in the form of one unit, with the light emitting diodes being integrated in the optical unit (or the reflector).

Although in the foregoing embodiments reference has been made to a reading lamp the lighting unit can also be implemented in other lamps. Those lamps can then be provided for example in or at a ceiling in a room. The lighting unit can further be implemented in a standard lamp or the like.

It is thus possible to implement wireless communication by means of a lamp or a reading lamp.

The invention claimed is:

1. A lamp comprising:
 a lighting unit having first light emitting diodes for emitting an infrared light and second light emitting diodes for emitting a visible light;
 an input terminal configured to receive an input signal; and
 a modulation unit coupled between the input terminal and the lighting unit, the modulation unit configured for modulation of the infrared light emission of the first light emitting diodes in dependence on the input signal for establishing a wireless transmission of the input signal from the lamp to a receiving unit, and
 an optical unit for influencing the light emission of the first and the second light emitting diodes so that the light emission of the first and second light emitting diodes occurs in a common direction.

2. A lamp as set forth in claim 1 wherein the optical unit has a reflector for at least partially reflecting the light emitted by the first and the second light emitting diodes.

3. A lamp as set forth in claim 1 wherein the lighting unit has a receiving unit for receiving modulated light.

4. A lamp as set forth in claim 1 wherein the light emitting diodes are adapted to emit the visible light and the infrared light independently of each other.

5. A lamp as set forth in claim 1 wherein the input signal contains an audio signal.

6. A lamp as set forth in claim 1, wherein the lamp is installed in a vehicle comprising a plurality of seats and a plurality of said lamps.

7. A lamp as set forth in claim 1, wherein the lamp is installed in a delegate speech station comprising at least one microphone for recording speech signals and said lamp.

* * * * *

UNITED STATES PATENT AND TRADEMARK OFFICE
CERTIFICATE OF CORRECTION

PATENT NO. : 8,687,977 B2  
APPLICATION NO. : 12/586251  
DATED : April 1, 2014  
INVENTOR(S) : Niehoff Page 1 of 1

It is certified that error appears in the above-identified patent and that said Letters Patent is hereby corrected as shown below:

In the Claims:

In column 6, line 16, claim 1, please delete "and".

In column 6, line 22, claim 1, please delete ", and" and insert --; and-- (in other words, delete the "," and insert a --;--).

Signed and Sealed this
Fifteenth Day of July, 2014

Michelle K. Lee
*Deputy Director of the United States Patent and Trademark Office*